(12) United States Patent
Heer, III (10) Patent No.: US 11,625,447 B2
(45) Date of Patent: Apr. 11, 2023

(54) DIRECT LINK GENERATOR FOR USER INTERFACE

(71) Applicant: SAP SE, Walldorf (DE)

(72) Inventor: Robert Heer, III, Hockenheim (DE)

(73) Assignee: SAP SE, Walldorf (DE)

( * ) Notice: Subject to any disclaimer, the term of this patent is extended or adjusted under 35 U.S.C. 154(b) by 508 days.

(21) Appl. No.: 16/146,680

(22) Filed: Sep. 28, 2018

(65) Prior Publication Data

US 2020/0104327 A1    Apr. 2, 2020

(51) Int. Cl.
*G06F 16/955* (2019.01)
*G06F 16/907* (2019.01)
*G06F 40/134* (2020.01)

(52) U.S. Cl.
CPC .......... *G06F 16/955* (2019.01); *G06F 16/907* (2019.01); *G06F 40/134* (2020.01)

(58) Field of Classification Search
CPC ............. G06F 16/9535; G06F 16/9566; G06F 16/638; G06F 16/86; G06F 16/94
See application file for complete search history.

(56) References Cited

U.S. PATENT DOCUMENTS

| | | | |
|---|---|---|---|
| 8,195,767 B2* | 6/2012 | Albrecht ............. | G06F 16/9574 709/219 |
| 9,075,777 B1* | 7/2015 | Pope ................... | G06F 16/9566 |
| 2003/0037070 A1* | 2/2003 | Marston ............. | H04N 21/8586 |
| 2005/0021862 A1* | 1/2005 | Schroeder .............. | G06Q 30/02 709/246 |
| 2007/0208744 A1* | 9/2007 | Krishnaprasad ...... | G06F 16/248 |
| 2013/0238470 A1* | 9/2013 | Takahashi ........... | G06F 16/9566 705/27.2 |
| 2016/0234330 A1* | 8/2016 | Popowitz ............ | H04L 67/2814 |
| 2018/0300421 A1* | 10/2018 | Andreica ............. | G06F 16/9562 |

* cited by examiner

*Primary Examiner* — Cindy Nguyen
(74) *Attorney, Agent, or Firm* — Mintz Levin Cohn Ferris Glovsky and Popeo, P.C.

(57) ABSTRACT

An input provided by a user via a user interface may be interpreted to identify one of a plurality of options available to be performed relating to at least one content item in a content database. The at least one content item may be identified by the interpreting of the received input. A data source of the content database may be contacted to extract information from the data source based on the received input. The extracted information may include a content identifier of the at least one content item and metadata associated with the at least one content item. A link (e.g. a URL or the like) to the at least one content item may be generated using the extracted information and provided.

20 Claims, 7 Drawing Sheets

DIRECT LINK GENERATOR FOR USER INTERFACE

TECHNICAL FIELD

The subject matter described herein relates generally to generation of direct links to content item(s) in a content database, which can optionally be a content management system or other online repository such as a learning catalog or the like.

BACKGROUND

A content database may generally include a file structure that may be configured such that access to a given content item (e.g., a document prepared in one or more applications, a video, an image, etc.) or group of content items stored in the content database requires that a user requesting the access be logged in to or have otherwise established sufficient permissions or credentials to access the content database in general and the content item(s) in particular.

Using existing approaches to providing direct access to such content items may present one or more of a number of challenges. For example, hyperlinks to content items, events, other data or metadata, etc. stored in a content database may not be easily created by an end user but instead may require intervention or specific action by a system administrator who has access to a required restricted interface provided by a database management system associated with the content database. In some current approaches, links displayed in an address bar of a web browser are not sharable. Lengthy steps may be required in existing solutions to create a single direct link (e.g. a uniform resource locator or other hyperlink, etc. that causes a browser to directly access a content or other material stored at a given location in a content database) within the content database system, which may in some examples take up to 2-3 minutes of manpower time to generate. Additionally, creation of multiple hyperlinks to a selection of various content items may not be supported by existing solutions, and generated links may not be compatible with use in proprietary spreadsheet, word processing, presentation, and similar programs (e.g., applications such as Excel, Word, and PowerPoint, and the like, which are available from Microsoft Corporation of Redmond, Wash.).

SUMMARY

In one aspect, a method includes input provided by a user via a user interface being received and interpreted to identify one of a plurality of options available to be performed relating to at least one link to at least one content item in a content database, and a data source of the content database is contacted to extract information from the data source based on the received input. Using the extracted information, a link to the at least one content item is generated.

In some variations one or more of the following features can optionally be included in any feasible combination. The link may include a human friendly link comprising a textual identifier embedded therein to assist a human in understanding the linked content.

Based on the input, it may be determined that the link should be a single URL to the at least one content item, the extracted information may be consolidated, and the single URL may be constructed.

The generated link may be displayed in the user interface. Alternatively, the generated link may be provided by opening a page and/or the at least one content item in a web browser using the generated link.

The opening of the page and/or the at least one content item in the web browser using the generated link may include preventing the user from seeing or being able to copy the generated link. A new data source may optionally be generated using the extracted information, and the generated link may direct to the new data source.

Interpreting of the received input may include identifying the input as a request to fix links in an existing file, and the generating of the link to the at least one content item may include extracting one or more links in the existing file, following the one or more links to related content items by contacting the data source, using data consolidated from the data source to construct one or more new links, and replacing one or more links in the existing file with the one or more new links.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter relates to various approaches, including methods as well as computer program products and computing systems for providing computer-implemented variations of such methods, for generating links or otherwise providing access to content items in a content database or other repository. Various operations described herein may be executed by software of a database management system associated with a content database or the like. Alternatively, some form of middleware (e.g., software that is not directly part of the database management system and that may optionally act as an intermediary or other add-on for processing of inputs between a user interface on a computing device and a database management system operating on that computing device and/or on another computing device) may perform one or more operations consistent with the descriptions herein. While one or more example implementations are described below, such examples are provided for illustration and are not intended to be limiting relative to the actual language of the claims.

In general, an input (e.g. a data string) provided by a user via a user interface may be analyzed, and based on one or more factors, a corresponding action may be performed. The input can include one or more values, which can be compared against a plurality of criteria to identify what type of action is being requested with the input. If the input is not sufficiently matched to a set of criteria (optionally among a plurality of sets of criteria) a default function may optionally be executed. In some examples, this default function may include processing of the input as a key element required for generating a hyperlink to a simple search view of a content database or repository. Alternatively to execution of a default function, the user may be queried for further input to ascertain the intended actions to be performed.

Entry of the input may be accomplished by a user interacting with one or more input devices or modalities on a computing device. This computing device may include a content database (e.g., a content repository), or may be in networked communication with another computing device that includes a content database. The computing device may display or otherwise provide a user interface via which the input is received.

As noted above, the input data string may in some cases be used to generate a hyperlink to a content item. However, some input data strings may provoke additional decision steps from a user, depending on the analysis of the input relative to information contained within the content database or other repository. Inputs from these additional decision steps may be used to determine how to provide one or more hyperlinks as part of a displayed or provided set of results. The information contained within the content database or other repository that is used in determining how to provide the one or more hyperlinks or to otherwise cause navigation can include one or more of metadata, data, technical details, or the like of or pertaining to various content items, the data structures in which they are contained, or the like. Some examples of such metadata, data, and/or technical details can include file names, creation dates, file types, file owners, last person to edit, a compression rate (e.g., for audio or image/video data), a program or type of program that created the content item, etc.

A single generated hyperlink can be opened in a web browser (e.g., the user's preferred web browser as selected in configuring the computing device via which the user provides the input) so as to display results matching the input data string from within the content database. A generated link or links may also optionally be displayed within a result field of a user interface. In some examples a list of URLs may be displayed, copied to a clipboard or other memory structure for later pasting, or otherwise made available to a user for use in navigating (or providing to others for them to navigate) to a plurality of content items that are determined to be responsive to the input.

In some further examples, an input can be or include a command that triggers one or more other events to occur. Alternatively or in addition, the input may include data string elements that are not explicitly a command but that are instead interpretable, for example by a database management system, by middleware, and/or by software implementing the user interface or otherwise running at the computing device on which the user interface is presented, to indicate that the user intended to trigger one or more events. Such an event may include, without restriction, extrapolation of data from .csv files (which can then be read through Microsoft Excel or some other spreadsheet application). The Excel data may then be processed, formatted and copied to pre-formatted tables in Microsoft Word (or some other word processing program) and ultimately printed and/or exported to some other format such as .pdf. In other use cases, a data string provided as at least part of the input may be used as a keyword to search through compiled stored data (optionally as .csv files or the like) and return results related to that data string.

Receipt and initial processing of an input may convert an input screen user interface to show more user interface elements (e.g. buttons, input field, check boxes, or the like) via which a user can request processing of the input in even more advanced iterations within other application environments, such as for example reading the data of a cell or multiple cells of a worksheet of a spreadsheet application, and converting a string of characters within the cell to a fully functional hyperlink depending on certain criteria being met within the found string of the selected cell(s). In some examples, instead of providing a hyperlink that may be copied (e.g., by adding to a "clipboard" or other feature in the memory or other storage of the computing system), the current subject matter can direct a browser operating on the computing system to navigate to the target destination (e.g., a content item or part or excerpt of a content item that is responsive to a query based on the input data string, a page or other view generated to display and/or otherwise provide navigation to one or more content items or parts or excerpts from one or more content items responsive to a query based on the input data string, etc.). In some optional implementations, the directing of the browser to navigate to the target destination can include hiding the navigation information or otherwise making it not possible for a user to copy and reuse the link, etc. This hiding of the link may be accomplished in some examples by calling a command to open (or otherwise make active) the web browser on the client machine, accessing identifier services to cause the web browser to navigate as directed, and then concealing the link such that the user may not copy it.

Figure 1:
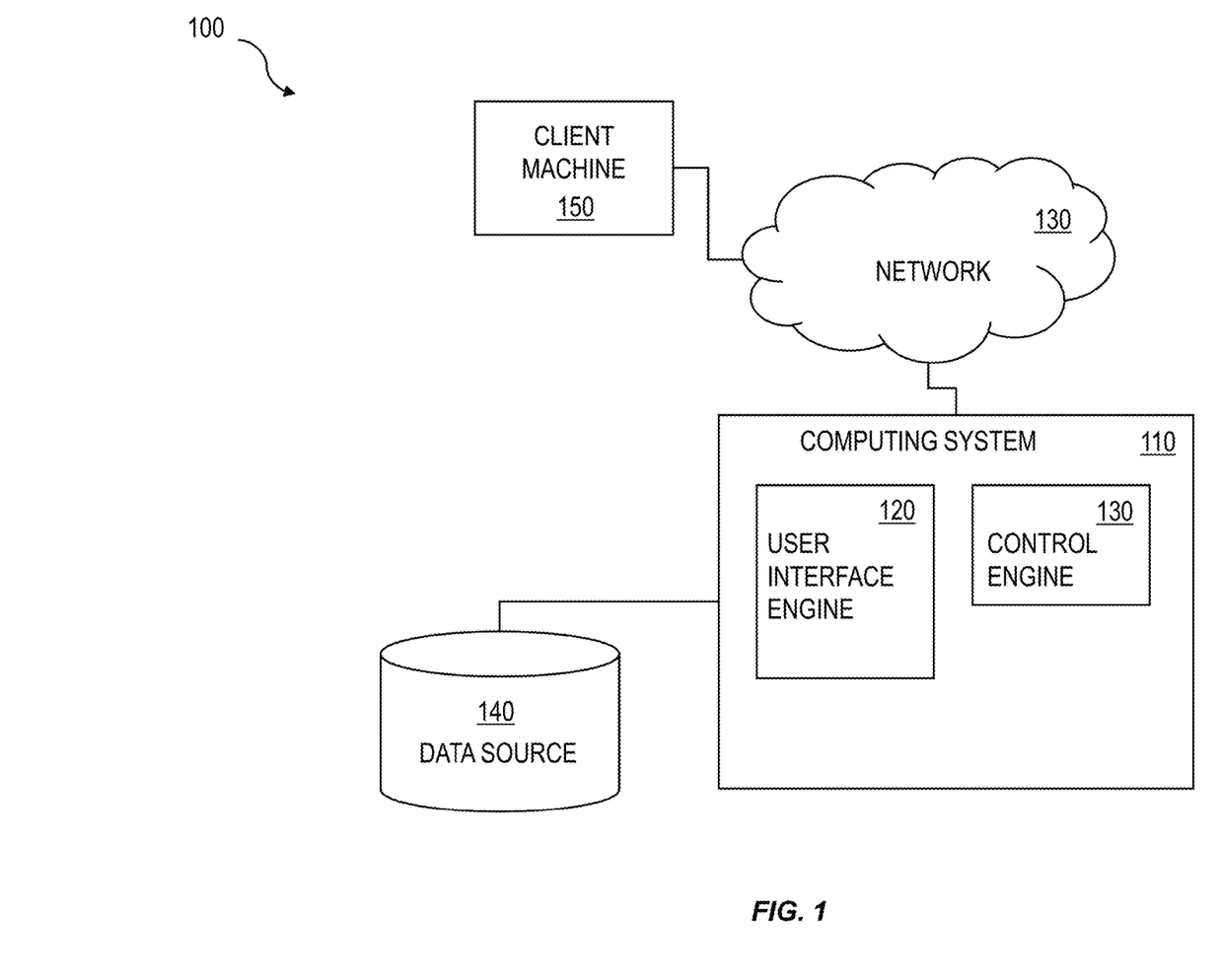
FIG. 1 shows a diagram illustrating aspects of a system showing features consistent with implementations of the current subject matter.

As shown in the system diagram 100 of FIG. 1, a computing system 110 consistent with implementations of the current subject matter can implement a user interface engine 120 and a control engine 130. Implement in this context indicates that software code, modules, etc. may be executed by one or more processors to result in the functionality of a user interface engine and a control engine as described below, regardless of whether such entities are implemented discretely as specific "engines." For example, a single software process may provide all or some user interface engine and control engine functionality as described herein. If multiple processes implement functionality as described, such functionality need not be apportioned between processes as described in the illustrative examples. It will be further understood that the computing system can include one or more discrete computing machines each including one or more physical programmable processors. In an implementation in which the computing system includes more than one discrete computing machine, the multiple computing machines may be networked together, either directly or over some form of communication network connection. The operations described herein as being performed by the computing system 110 may optionally be performed by all of one or more discrete computing machines or optionally separately by each of multiple computing machines. For example, one computing machine may implement certain aspects of a user interface engine 120 and another computing machine may implement certain aspects of a control engine 130, or such aspects may be implemented more or less uniformly across multiple computing machines making up the computing system 110.

As illustrated in FIG. 1, a computing system 110 providing functionality consistent with implementations of the current subject matter can also have access to at least one data source 140 (referred to herein as "the data source 140," which may include any number of data sources) accessible by the computing system 110. A user interface can be presented to a user of the computing system either via a display (e.g. one or more graphical elements shown on a monitor, a touch screen, or some other visual presentation device) or via some other sensory modality (auditory, haptic, etc.). The display can optionally be part of a local computing device (e.g., a client machine 150) with which the user interacts. As noted above this computing device can optionally be in communication with another computing device (or devices) upon which the user interface engine 120 and/or the control engine 130 are implemented. The database management system can be implemented on one or more other computing devices or optionally on still other computing devices.

The user may provide an input via the user interface (e.g. via one or more user interface elements such as a text entry box, pull down menu, voice recognition, or any other approach for providing an input to the computing system 110). In some examples, the user interface, which can be generated and/or controlled by the user interface engine 120, can be presented via the client machine 150 or by a computing machine that is part of the computing system 110 itself. A client machine 150 can access the other components of the computing system over any kind of data communication network. The input received via the user interface is provided to the control engine 130, which interprets the input and optionally extracts other relevant information related to the input from the data source 140.

Figure 2:
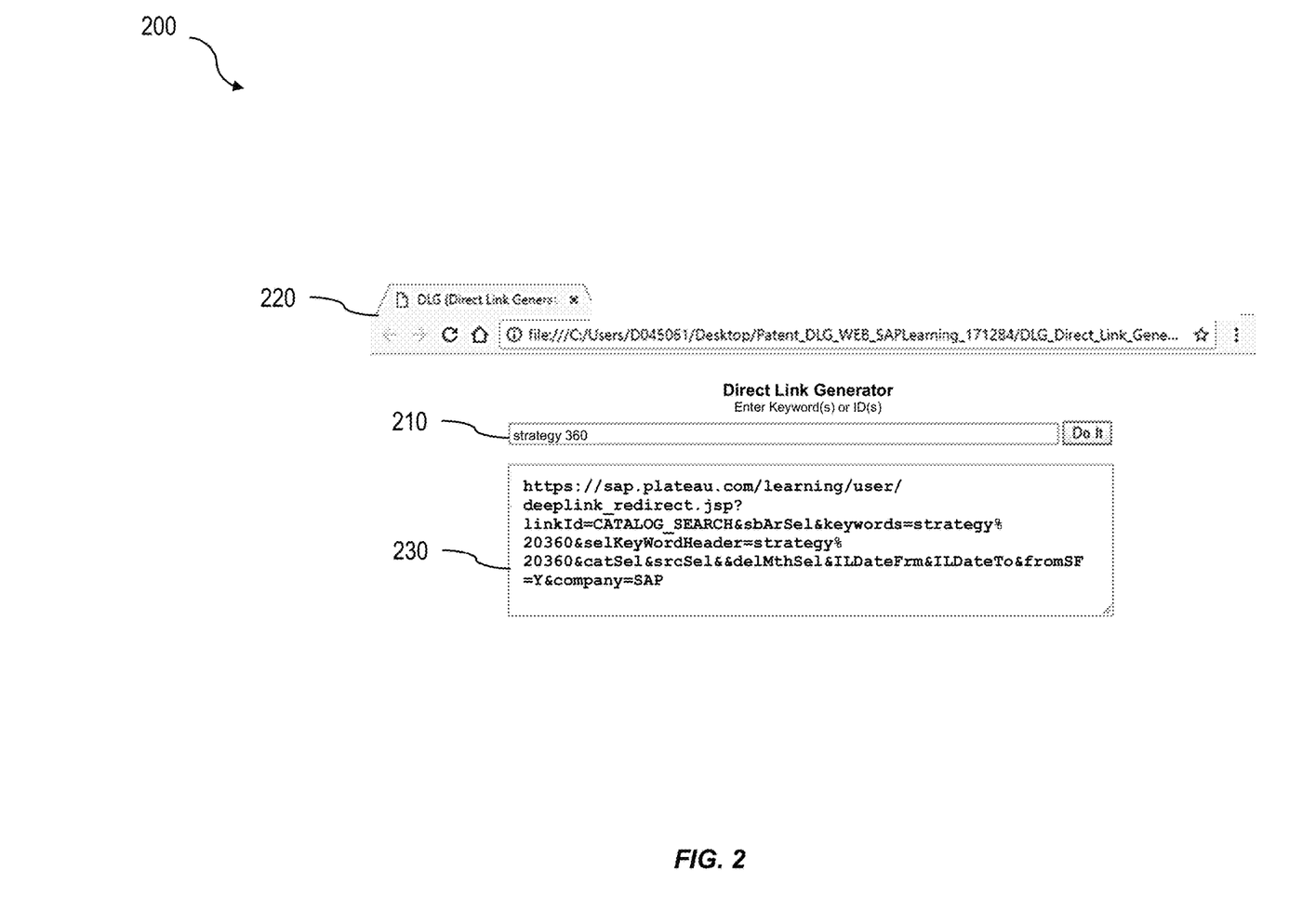
FIG. 2 shows a view of an example user interface consistent with implementations of the current subject matter.

FIG. 2 shows a view 200 of an example user interface in which an input entry user interface element (in this non-limiting example a text entry box) 210 is displayed in a browser 220. A results box 230 is also provided in which a generated link can be displayed.

Figure 3:
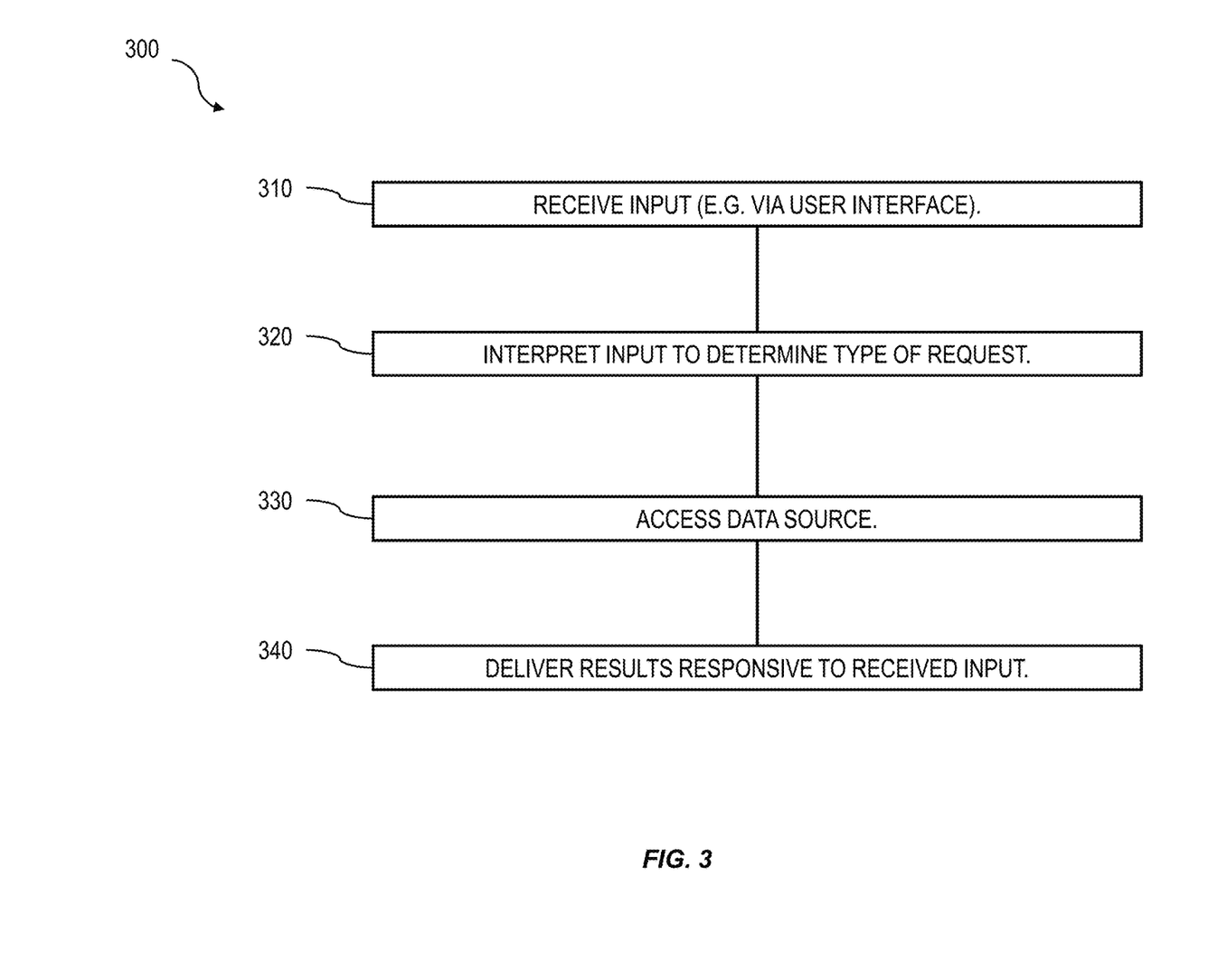
FIG. 3 shows a process flow diagram illustrating aspects of a method for interpreting a received input and accessing a data source to cause delivery of a responsive result, and having one or more features consistent with implementations of the current subject matter.

FIG. 3 shows a process flow chart 300 illustrating various operations relating to interpreting a received input and accessing a data source to cause delivery of a responsive result that a control engine may perform consistent with one or more implementations of the current subject matter. Upon a user interface or user interface element of a user interface receiving an input (e.g. from a user) at 310, a control engine 130 may perform one or more interpretation actions on the input to determine how to generate links, to what content items those links should be directed, and how the generated links should be returned. As a first part of the operation, the control engine analyzes the input to identify a type of input. For example, the control engine 130 can interpret at 320 that the input is or includes a search term, a unique identifier for a given content item, a deep link, a request to create a deep link, a request for fixing URLs in a native application (e.g. Microsoft Word, PowerPoint, Excel, or the like), a request for generating multiple URLs (e.g. for inclusion in a spreadsheet file or other application-specific format), a request that requires generation of a new data source (e.g. for generating lists, tables, documents, statistics, or the like), etc. Optionally, the control engine 130 may determine that the input also includes an explicit command or some sort of implicit requirement for action based on a command implied by the requested action. The control engine 130 accesses a data source at 330 and at 340 causes delivery of a result or results responsive to the received input as qualified by any identified explicit or implicit commands in the input. Implicit commands may be inferred from data strings in the input such as "audio" or "video," file type indicators such as "presentations" or "PDF" or "text", or any similar types of inputs that may imply that the user intended to include additional specificity as part of the request. In this manner, the results identified in the data source and the returned links or other navigation information may be provided with more useful specificity.

Figure 4:
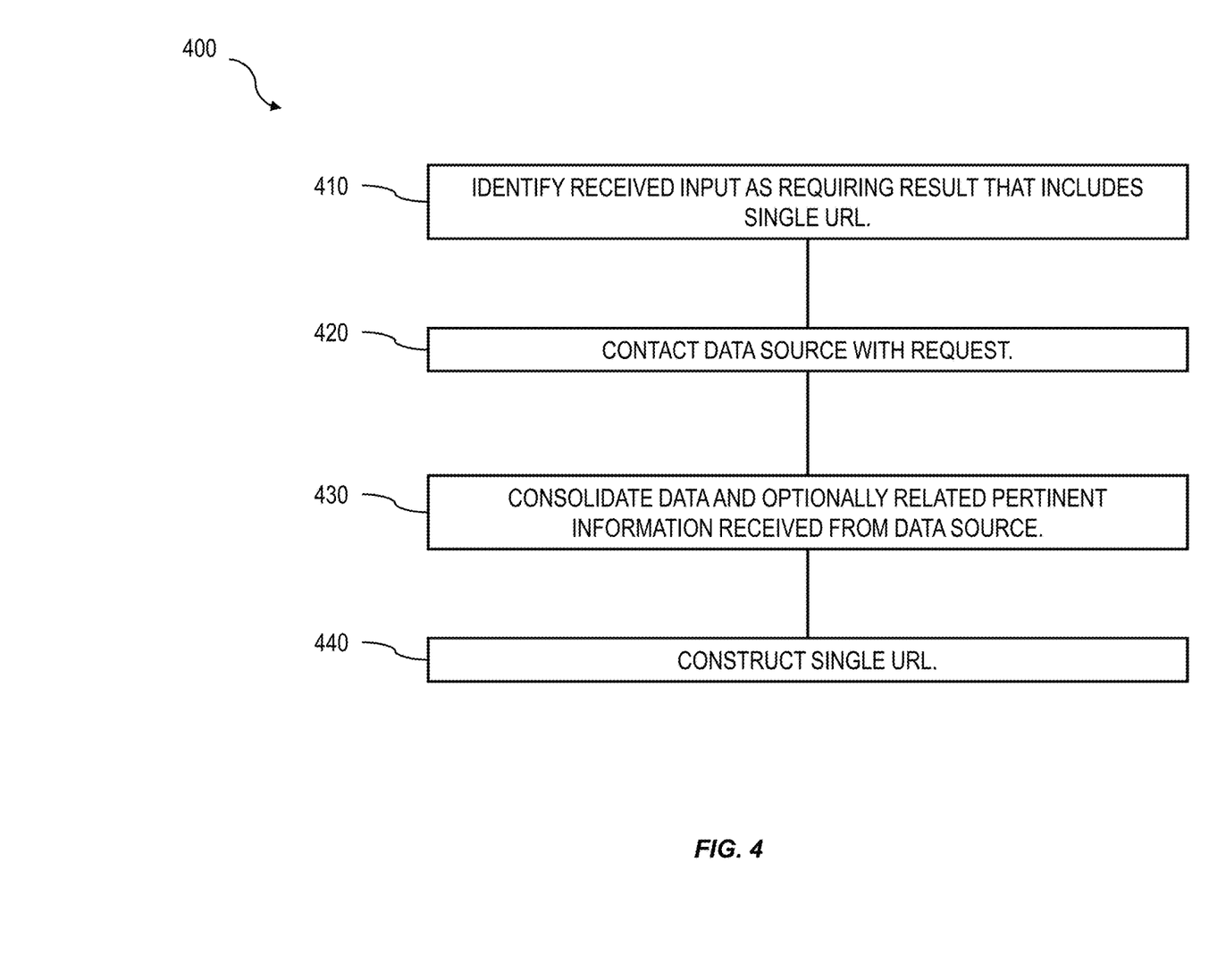
FIG. 4 shows a process flow diagram illustrating aspects of a method for generating a single URL to one more content items requested by an input, and having one or more features consistent with implementations of the current subject matter.

As shown in the process flow chart 400 of FIG. 4, when the control engine 130 at 410 identifies an input as a search term, a unique identifier for a given content item, a deep link, a request to create a deep link, or the like, the control engine 130 determines that a single URL to the requested content item or items is to be generated. The control engine 130 contacts the data source 140 at 420 with a request. In response to data and related pertinent information received from the data source 140 in response to this request, at 430 the control engine 130 consolidates the received data and related pertinent information and at 440 constructs a single URL that may be formatted to be "human friendly" and meaningful. In this context, the term "human friendly" as it refers to a URL or link indicates that the URL or link includes at least one portion of a text string that provides (in a language understandable by the user) some plain text explanation of the content item or items to which the link navigates.

The related pertinent information may optionally include a minimum amount of framing information to support navigation to the content determined to be responsive to the input. In some examples, the control engine 130 may request from the data source 140 only a minimum set of information necessary for response to the request derived from the input, which may be as little as the information necessary for generation of a URL in some cases. In other cases, based on commands that are explicit in the input or implicit in what is determined to have been requested, the control engine 130 may request additional pertinent information, which may include a data type (e.g. voice recording, image data, programs capable of opening a returned content item), statistical information about the content item (e.g., file size, date and/or time of last access, date and/or time of creation or last modification, a unique identifier for the content item, etc.), and/or other metadata or the like.

In other examples, the pertinent information may include navigation data capable of first directing a browser to a log-in screen and then directly to the linked content, such that a user clicking on the link need not be already logged into the content database or the database management system to directly access the linked content. Instead, upon clicking the link, the browser may show a log-in window (e.g., as a pop-up or floating user interface element) and then close this log-in window and direct to the linked content immediately upon receiving properly validated log-in credentials from a user.

In an example in which the received input is directed to a single content item, the generated URL directs to that content item. In other examples in which the input directs to multiple content items, or optionally to multiple events related to content items (e.g. live training sessions relating to content items in a data source that includes a training or learning database or repository), the single URL may direct to a page view, which may optionally include the multiple returned content items, a calendar view showing one or more events, or the like. As an example of the page view result, an input that requests information on a given topic in a learning catalog storing multiple training or educational content items may cause the control engine 130 to generate and return a link to a learning plan, a customized catalog page, a learning curriculum, or the like containing content items related to the input.

As noted, the generated URL may be customized or otherwise formatted to be more understandable by human users, for example by inclusion of a textual identifier, which may be extracted from content items related to the input, from an existing link to one or more content items, etc. The generated link may be a "deep link" which directs a user to a page displaying content item details. In examples such as those noted above in which the generated deep link includes login functionality that causes a not yet logged in user to be shown an intermediate login page that then directs to the linked content page or content item upon receiving input of the user's credentials, the "user" accessing the intermediate login page need not be the same person or entity from whom the original input came to result in creation of the link by the control engine 130.

Further operations not shown in the flow chart of FIG. 4 may include displaying the generated single URL in the user interface and/or opening the URL in a default web browser on the user's machine (e.g. the client machine 150). As noted above, the opening of the URL in the default web browser may involve providing the URL to the browser in a manner that does not permit the user to copy the link to save for later use or to forward to other users. For example, as noted above, the browser may be directed to navigate to the generated single URL but to display a "dummy" link in the browser's navigation bar such that copying of this link or any attempt to use it on a different machine or at a later time would be unsuccessful.

Figure 5:
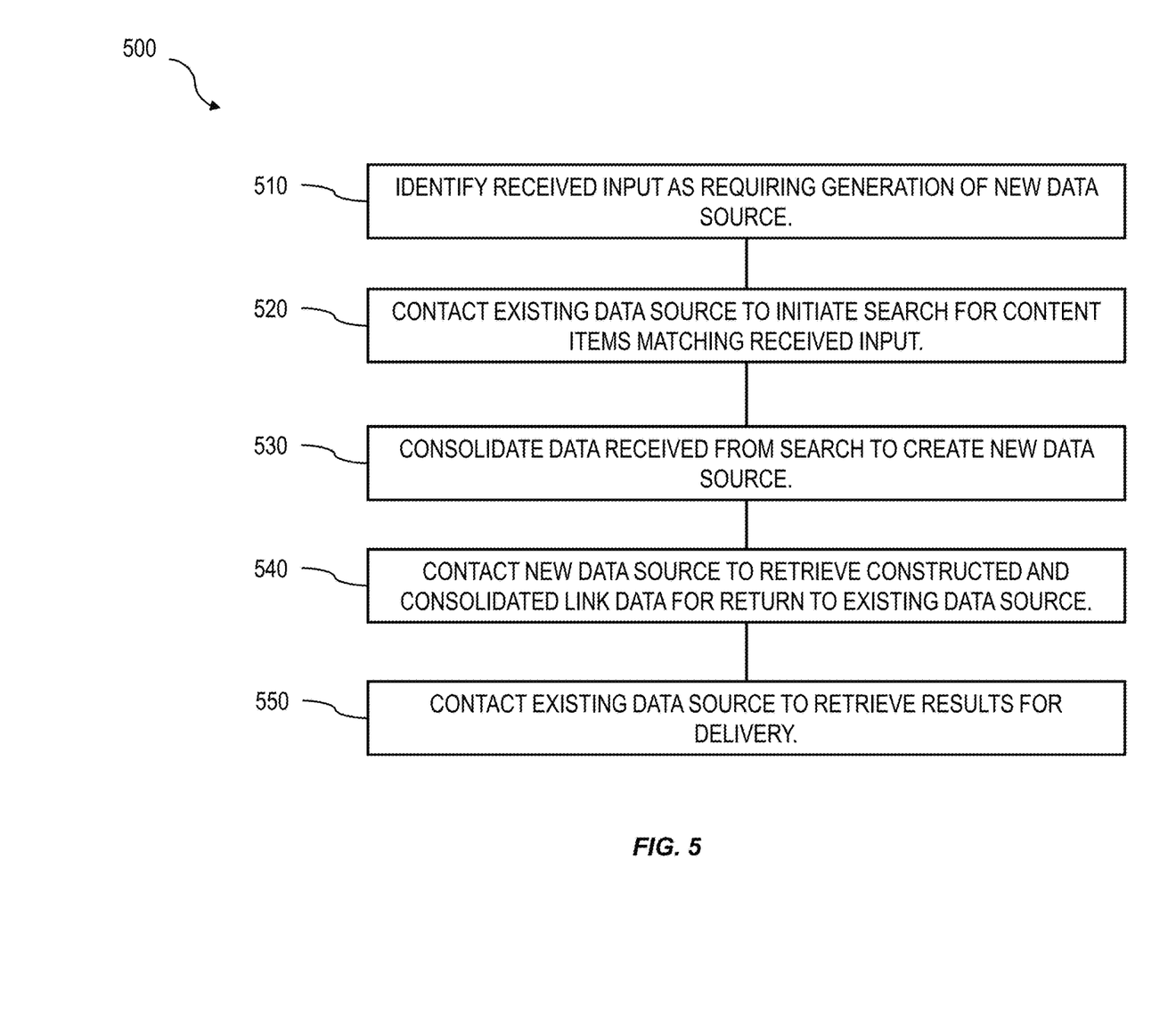
FIG. 5 shows a process flow diagram illustrating aspects of a method for generating and using a new data source, and having one or more features consistent with implementations of the current subject matter.

The process flow chart 500 of FIG. 5 shows other features that may be included in approaches consistent with implementations of the current subject matter. The method and/or operations illustrated in FIG. 5 may include generation and use of a new data source, which may be beneficial for improving performance in responding to queries and/or in reducing data source accesses required for providing access to requested content. Consistent with implementations of the current subject matter and as alluded to above, a new data source may be created by pulling data from one or more existing data sources 140 (e.g. from parts of one or more content databases or repositories. The control engine 130 may advantageously pull only relevant data from one or more existing data sources into the new data source. For example, the new data source may have a reduced footprint as a result of including only minimal information to allow navigation to the identified content items. In some examples, the new data source may be a list of record identifiers, which may optionally be formatted as a text file, a comma separated value (csv) file, or the like.

When the control engine at 510 identifies an input as a request that requires generation of a new data source, such as for generating lists, tables, documents, statistics, or the like, the control engine contacts an existing data source at 520 to initiate a search for content items matching the received input. At 530, data responsive to the search are consolidated and used to create the new data source, which is contacted (e.g. by the control engine 130) at 540 to retrieve constructed and consolidated link data for return to the existing data source. The control engine 130 then contacts the newly populated (e.g. with the returned constructed and consolidated link data) existing data source again at 550 to retrieve the results (e.g. for formatting and presenting to the user). In some examples, the new data source may be sufficient to support basic navigation to identified content items while lacking a full suite of data necessary to support deeper navigation operations. In such cases, a link returned by the control engine 130 may direct to the new data source while also providing an embedded link to the original data source in the event that a user wishes to navigate further. Among other use cases in which this capability may be relevant, the new data source may provide more efficient access to the linked content without necessarily providing the full context available in the existing data source. If a user desires more context, the control engine 130 may access one or both of the new data source and the existing data source. The control engine 130 may also determine based on the input which (or both) of the new data source and existing source to access to provide the necessary information.

The approach of FIG. 5 can be used in conjunction with requests to generate a list of content items with corresponding individual links for display within a user interface. Such a list can include content item statistics. Alternatively or in addition, meta data retrieved as part of the contacting of the existing data source at 510 can include metadata, which can be used in searching for content items relevant to the input data string and/or for generating statistics about the retrieved content items. This metadata can include one or more of a content item owner, a next review date, a number of accesses, ratings (e.g. by past users of the content item), and the like. Other possible data that can be retrieved and/or generated in conjunction with the operations described and shown in FIG. 5 can include scheduling (e.g. creating a listing of available items in a learning content database indicating when certain content items are to be presented in training sessions, generating documents relating to completion status (e.g. with regard to specific learning-related content items) of registered users in a learning database, identifying content items having an upcoming date for being reviewed (and/or modified, deleted, etc.), or the like.

Figure 6:
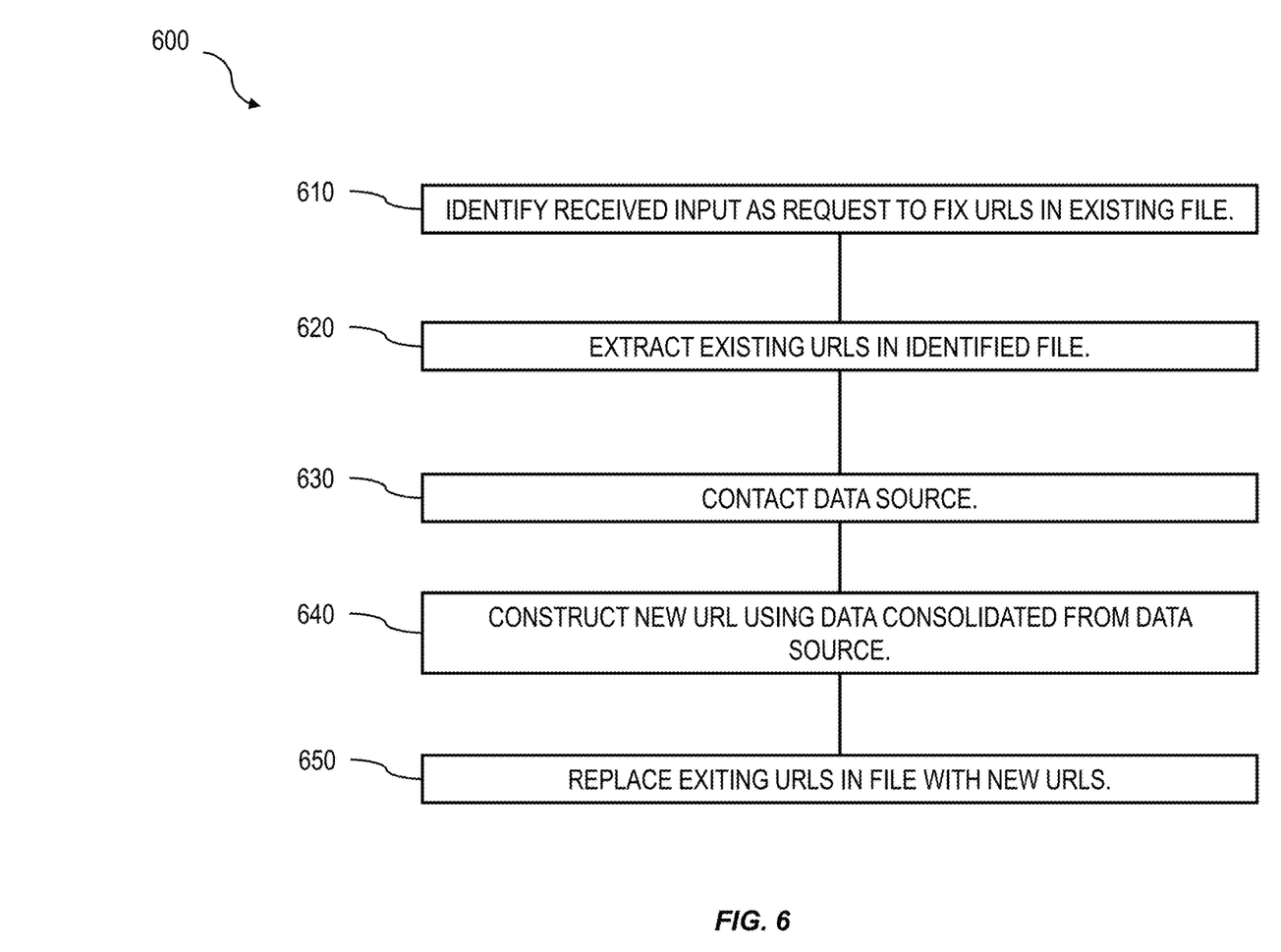
FIG. 6 shows a process flow diagram illustrating aspects of a method relating to repair of embedded links in files, and having one or more features consistent with implementations of the current subject matter.

FIG. 6 shows a process flow chart 600 relating to a method and/or computing operation for repair of embedded links in files. At 610, an input is identified as a request to fix URLs in an existing file (e.g. a PowerPoint file, a Word document, or any other kind of application file). Existing URLs in the identified file are extracted at 620 and the related content items are compared to the existing URLs by contacting the data source at 630. At 640, data consolidated from the data source is used to construct new URLs, which are used to replace existing URLs in the file at 650. In this manner, a user can open a file (e.g. a PowerPoint file) containing links to content items in the content database, activate a tool via a user interface input, and cause the system to access all links in the document for replacement with "human friendly" rich links. Such an approach can be useful for providing an educational presentation, generating a PDF of training materials, etc.

Figure 7:
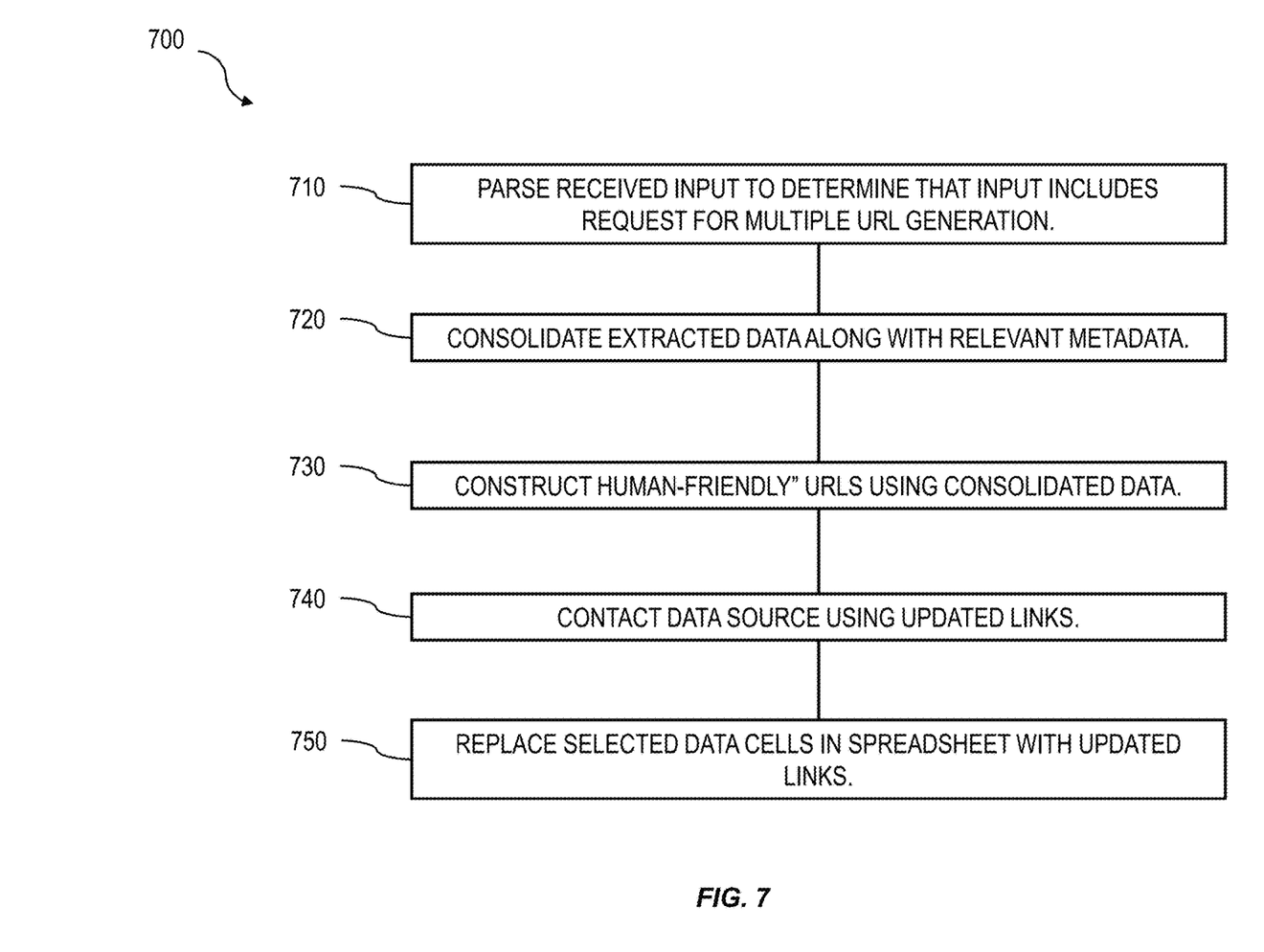
FIG. 7 shows a process flow diagram illustrating aspects of a method relating to generation of multiple URLs for inclusion within an existing spreadsheet, and having one or more features consistent with implementations of the current subject matter.

FIG. 7 shows a process flow chart 700 relating to a method and/or operation for generation of multiple URLs for inclusion within an existing spreadsheet. At 710, a received input (e.g. received via a user interface) is parsed to determine that a request for multiple URL generation has been received. This input can include a range or list of data cells within a spreadsheet (e.g. a Microsoft Excel file). Data are extracted from the identified cells to identify which content items need to be linked in the spreadsheet and at 720 these extracted data are consolidated along with relevant metadata. "Human-friendly" URLs are constructed using the consolidated data at 730, and at 740 the data source is contacted using the updated links, which are at 750 used to replace the selected data cells in the spreadsheet.

In general, the above-described examples include, but are not necessarily limited to, variants of an approach enabled by the current subject matter in which input received from a user via a user interface is interpreted to identify one of multiple options that can be performed relating to links to content items in a content database. A data source of the content database is contacted to extract information based on the received input. The extracted information includes both content identifiers as well as metadata and/or other pertinent information, which may be used to generate human friendly links having at least some textual identifier embedded therein to assist a human in understanding what content is linked. The one or more generated links may be provided via one of the approaches discussed above or equivalents.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together but omitting C, A and C together but omitting B, B and C together but omitting A, or A and B and C together."

Use of the term "based on," above and in the claims is intended to mean, "based at least in part on," such that an unrecited feature or element is also permissible.

Other implementations may be within the scope of the following claims.

What is claimed is:

1. A computer program product comprising a non-transitory, machine-readable medium storing instructions that, when executed by at least one programmable processor, cause the at least one programmable processor to perform operations comprising:
   receiving an input provided via a user interface, wherein the input indicates a first request that requires generation of a new data source from a data source to enable improved query performance when compared to the data source and/or a second request to repair a first uniform resource locator embedded in an existing file;
   interpreting the received input including the first request and/or the second request to identify one of a plurality of options available to be performed relating to the first uniform resource locator, the first uniform resource locator being directed to at least one content item stored in a content database, the at least one content item being identified by the interpreting of the received input;
   contacting a data source of the content database to extract, based on the received input, information from the data source, the extracted information comprising a content identifier of the at least one content item and metadata associated with the at least one content item;
   in response to determining, based on the interpreting of the received input, that the received input comprises the first request to generate the new data source, generating the new data source by at least storing a copy of the at least one content item in the new data source, contacting the new data source to retrieve a second uniform resource locator directed to the copy of the at least one content item stored in the new data source, and providing the second uniform resource locator; and
   in response to determining, based on the interpreting of the received input, that the received input comprises the second request to repair the first uniform resource locator embedded in the existing file, generating, based on the extracted information, a third uniform resource locator directed to the at least one content item by at least extracting the first uniform resource locator from the existing file, comparing the first uniform resource locator to a related content item, constructing the third uniform resource locator based on the extracted information, and replacing the first uniform resource locator in the existing file with the third uniform resource locator.

2. A computer program product as in claim 1, wherein the second uniform resource locator comprises a human friendly link comprising a textual identifier embedded therein to assist a human in understanding the linked content.

3. A computer program product as in claim 1, wherein the operations further comprise:
   determining, based on the received input, that the third uniform resource locator should be a single uniform resource locator to the at least one content item;
   consolidating the extracted information; and
   constructing the single uniform resource locator.

4. A computer program product as in claim 1, wherein providing the second uniform resource locator comprises displaying the second uniform resource locator in the user interface.

5. A computer program product as in claim 1, wherein providing the second uniform resource locator comprises opening a page and/or the copy of the at least one content item in a web browser using the second uniform resource locator.

6. A computer program product as in claim 5, wherein the opening of the page and/or the copy of the at least one content item in the web browser using the second uniform resource locator comprises preventing the user from seeing or being able to copy the second uniform resource locator.

7. A computer program product as in claim 1, wherein the second uniform resource locator further includes an embedded link directed to the at least one content item in the content database.

8. A computer program product as in claim 1, wherein comparing the first uniform resource locator to the related content item further comprises contacting the data source, and wherein the constructing the third uniform resource locator further comprises using data consolidated from the data source to construct the third uniform resource locator.

9. A computer-implemented method comprising:
   receiving an input provided via a user interface, wherein the input indicates a first request that requires generation of a new data source from a data source to enable improved query performance when compared to the data source and/or a second request to repair a first uniform resource locator embedded in an existing file;
   interpreting the received input including the first request and/or the second request to identify one of a plurality of options available to be performed relating to the first uniform resource locator, the first uniform resource locator being directed to at least one content item stored in a content database, the at least one content item being identified by the interpreting of the received input;

contacting a data source of the content database to extract, based on the received input, information from the data source, the extracted information comprising a content identifier of the at least one content item and metadata associated with the at least one content item;

in response to determining, based on the interpreting of the received input, that the received input comprises the first request to generate the new data source, generating the new data source by at least storing a copy of the at least one content item in the new data source, contacting the new data source to retrieve a second uniform resource locator directed to the copy of the at least one content item stored in the new data source, and providing the second uniform resource locator; and in response to determining, based on the interpreting of the received input, that the received input comprises the second request to repair the first uniform resource locator embedded in the existing file, generating, based on the extracted information, a third uniform resource locator directed to the at least one content item by at least extracting the first uniform resource locator from the existing file, comparing the first uniform resource locator to a related content item, constructing the third uniform resource locator based on the extracted information, and replacing the first uniform resource locator in the existing file with the third uniform resource locator.

10. A computer-implemented method as in claim 9, wherein the second uniform resource locator comprises a human friendly link comprising a textual identifier embedded therein to assist a human in understanding the linked content.

11. A computer-implemented method as in claim 9, further comprising:
   determining, based on the received input, that the third uniform resource locator should be a single uniform resource locator to the at least one content item;
   consolidating the extracted information; and
   constructing the single uniform resource locator.

12. A computer-implemented method as in claim 9, wherein providing the second uniform resource locator comprises displaying the second uniform resource locator in the user interface.

13. A computer-implemented method as in claim 9, wherein providing the second uniform resource locator comprises opening a page and/or the copy of the at least one content item in a web browser using the second uniform resource locator.

14. A computer-implemented method as in claim 13, wherein the opening of the page and/or the copy of the at least one content item in the web browser using the second uniform resource locator comprises preventing the user from seeing or being able to copy the second uniform resource locator.

15. A computer-implemented method as in claim 9, wherein the second uniform resource locator further includes an embedded link directed to the at least one content item in the content database.

16. A computer-implemented method as in claim 9, wherein comparing the first uniform resource locator to the related content item further comprises contacting the data source, and wherein the constructing the third uniform resource locator further comprises using data consolidated from the data source to construct the third uniform resource locator.

17. A system comprising computer hardware configured to perform operations comprising:
   receiving an input provided via a user interface, wherein the input indicates a first request that requires generation of a new data source from a data source to enable improved query performance when compared to the data source and/or a second request to repair a first uniform resource locator embedded in an existing file;
   interpreting the received input including the first request and/or the second request to identify one of a plurality of options available to be performed relating to the first uniform resource locator, the first uniform resource locator being directed to at least one content item stored in a content database, the at least one content item being identified by the interpreting of the received input;
   contacting a data source of the content database to extract, based on the received input, information from the data source, the extracted information comprising a content identifier of the at least one content item and metadata associated with the at least one content item;
   in response to determining, based on the interpreting of the received input, that the received input comprises the first request to generate the new data source, generating the new data source by at least storing a copy of the at least one content item in the new data source, contacting the new data source to retrieve a second uniform resource locator directed to the copy of the at least one content item stored in the new data source, and providing the second uniform resource locator; and
   in response to determining, based on the interpreting of the received input, that the received input comprises the second request to repair the first uniform resource locator embedded in the existing file, generating, based on the extracted information, a third uniform resource locator directed to the at least one content item by at least extracting the first uniform resource locator from the existing file, comparing the first uniform resource locator to a related content item, constructing the third uniform resource locator based on the extracted information, and replacing the first uniform resource locator in the existing file with the third uniform resource locator.

18. A system as in claim 17, wherein the operations further comprise:
   determining, based on the received input, that the third uniform resource locator should be a single uniform resource locator to the at least one content item;
   consolidating the extracted information; and
   constructing the single uniform resource locator.

19. A system as in claim 18, wherein the second uniform resource locator further includes an embedded link directed to the at least one content item in the content database.

20. A system as in claim 18, wherein comparing the first uniform resource locator to the related content item further comprises contacting the data source, and wherein the constructing the third uniform resource locator further comprises using data consolidated from the data source to construct the third uniform resource locator.

* * * * *